No. 666,624. Patented Jan. 22, 1901.
J. C. GEBHART.
REVERSING MECHANISM FOR SHAFTING.
(Application filed July 5, 1900.)
(No Model.) 2 Sheets—Sheet 1.
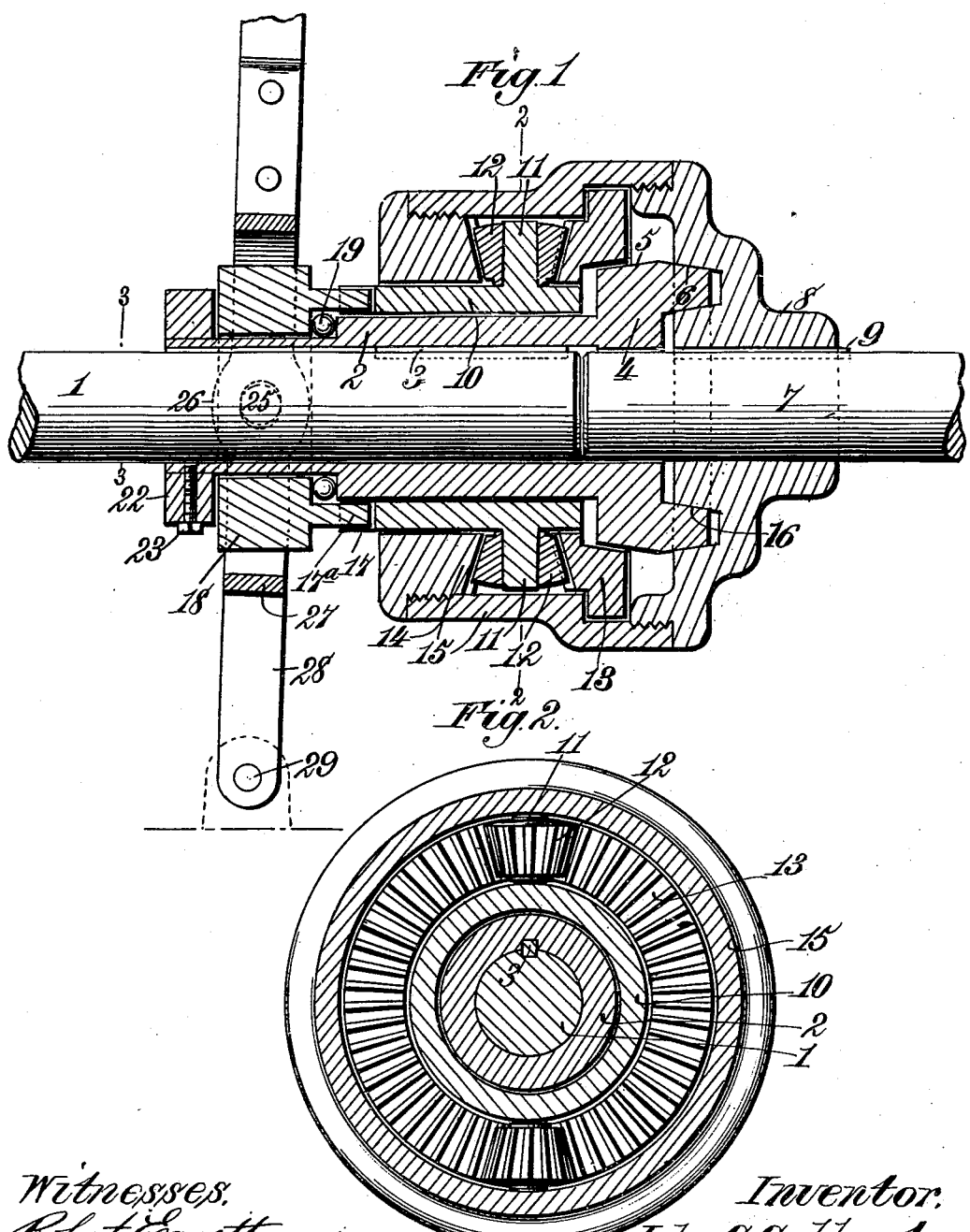
Witnesses.
Robert Everett,
Inventor.
John C. Gebhart.
By James L. Norris
Atty.

No. 666,624. Patented Jan. 22, 1901.
J. C. GEBHART.
REVERSING MECHANISM FOR SHAFTING.
(Application filed July 5, 1900.)

(No Model.) 2 Sheets—Sheet 2.

Witnesses.
Robert Emmett.
H. B. Keefer.

Inventor.
John C. Gebhart.
By James L. Norris.
Atty.

UNITED STATES PATENT OFFICE.

JOHN C. GEBHART, OF NEW ORLEANS, LOUISIANA, ASSIGNOR TO THE GULF MOTOR WORKS, OF SAME PLACE.

REVERSING MECHANISM FOR SHAFTING.

SPECIFICATION forming part of Letters Patent No. 666,624, dated January 22, 1901.

Application filed July 5, 1900. Serial No. 22,615. (No model.)

*To all whom it may concern:*

Be it known that I, JOHN C. GEBHART, a citizen of the United States, residing at New Orleans, in the parish of Orleans and State of Louisiana, have invented new and useful Improvements in Reversing Mechanism for Shafting, of which the following is a specification.

This invention relates to reversing mechanism for shafting, and has for its principal object to provide simple, compact, and reliable means for coupling a driving power with a driven shaft and for reversing said driven shaft without reversing the engine.

The invention consists in features of construction and in novel combinations of parts in reversing mechanism for shafting applicable to propeller-shafts and for other purposes, as hereinafter more particularly described.

Figure 3:
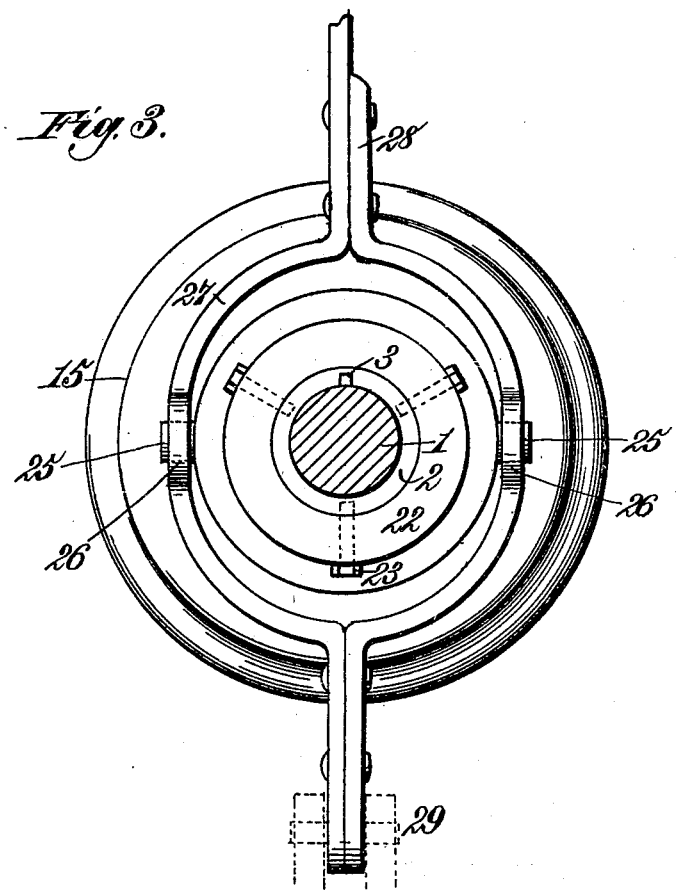
Figure 4:
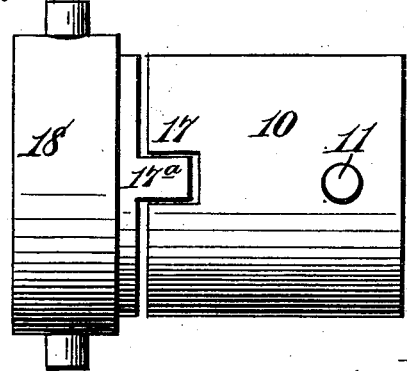

In the annexed drawings, Figure 1 is a longitudinally-sectional view illustrating my invention for the coupling of an engine-shaft and a propeller-shaft, with means for reversing the propeller-shaft without reversing the engine. Fig. 2 is a transverse section of the same on the line 2 2 of Fig. 1. Fig. 3 is a transverse section on the line 3 3 of Fig. 1. Fig. 4 is a detail view.

The reference-numeral 1, Figs. 1, 2, and 3, designates an engine-shaft, and 2 is an inner sleeve connected with said shaft by a feather 3 to rotate with the shaft and be longitudinally movable thereon. One end of the sleeve 2 is formed with a double friction-disk 4, having its periphery provided with reversely-inclined friction-surfaces 5 and 6, as shown in Fig. 1.

One end of the engine-shaft is in close juxtaposition to the end of a driven shaft 7, Fig. 1, which may be a propeller-shaft or any other length of shafting for power purposes generally. On this shaft 7 there is a hub 8, secured to said shaft by a key 9 or otherwise.

For a portion of its length the inner sleeve 2 is surrounded by an outer sleeve 10, having its periphery provided with a plurality of radially-arranged studs or journals 11 for bevel-pinions 12, Figs. 1 and 2, that are loosely placed on said studs. These bevel-pinions 12 are meshed on one hand with the bevel-teeth of a friction-disk and bevel-gear 13, that loosely surrounds one end of the outer sleeve 10, as shown in Fig. 1. On the other hand, the several bevel-pinions 12 mesh with the bevel-teeth of a gear 14, which is loose on the other end portion of the outer sleeve 10, as also shown in Fig. 1. The bevel-gear 14 has a screw-threaded connection with one end of a tubular casing 15, the other end of which has a similar connection with the hub 8, that is secured to the driven shaft. The several gears, as well as the pinions 12, are housed by the casing 15, as shown, and are thus protected from injury and from obstruction by any foreign matter. The loose friction-disk and bevel-gear 13 is constructed on one face with bevel-teeth for engaging the teeth of the pinions 12, and in its other face it is provided with a beveled friction-surface adapted to be engaged by the bevel friction-surface 5 on the double friction-disk 4, the other beveled friction-surface 6 of said double friction-disk being adapted to be engaged with a beveled friction-surface that is formed in the hub 8 of the driven shaft. By reference to Fig. 1 it will be observed that the double friction-disk 4 is recessed around the driven shaft 7 to provide an internal friction-face 16 opposite the friction-face 6 to engage a corresponding friction-face on the inner portion of the hub.

The outer sleeve 10 is provided at one end with an annular series of tongues 17 of sufficient length to have a sliding engagement with similar tongues 17ª, Fig. 4, on the collar 18 without becoming disengaged therefrom. The collar 18 and the inner sleeve 2 are constructed to provide bearing-surfaces for an annular series of balls 19, constituting an antifriction thrust-bearing. Beyond the collar 18 there is a collar 22, that is detachably secured to the inner sleeve 2 by means of bolts 23 or otherwise. This collar 22 provides a bearing for the collar 18 in one direction or opposite to its bearing on the series of balls 19.

The collar 18 is provided on opposite sides with lugs 25 for engagement with eyes 26 in the opposite sides of a ring 27, Figs. 1 and 3, which forms part of a reversing-lever 28, that has its lower end provided with a suitable fulcrum 29 below the shafting.

When the several parts of the reversing mechanism are in the position shown in Fig. 1, the rotation of the engine-shaft 1 will be transmitted through the sleeve 2 and double friction-disk 4 to the hub 8 and thence to the driven shaft 7, on which said hub is secured, consequently rotating the driven shaft in the same direction as the engine-shaft. In order to reverse the driven shaft 7, the lever 28 will be thrown in such direction as to cause the collar 18 to bear forcibly against the collar 22, that is secured to the inner sleeve 2, thereby retracting this sleeve 2 and causing the friction-surface 6 of the disk 4 to become disengaged from the hub 8, while the friction-disk 5 of said disk will become engaged with the loose friction-disk and bevel-gear 13, Fig. 1. The rotation of the engine-shaft 1 will now be transmitted through the sleeve 2, double friction-disk 4, loose friction-disk and bevel-gear 13, pinions 12, and loose bevel-gear 14 to the casing 15 and hub 8 of the driven shaft, thereby rotating said shaft 7 in an opposite direction to the rotation of the engine-shaft. Suitable clearances 30 and 31, Fig. 1, are provided on opposite sides of the double friction-disk 4 to permit a sufficient range of movement to said disk in alternately engaging it with the hub 8 or loose friction-disk and bevel-gear 13 as may be required.

It will be observed that the gearing described constitutes a coupling for the driving-shaft and driven shaft, as well as providing an efficient and reliable means for reversing the driven shaft without reversing the engine, thereby saving the latter from wear and tear and enabling the driven shaft to be promptly reversed whenever required.

What I claim as my invention is—

1. A reversing mechanism for shafting, comprising a hub 8 secured to a driven shaft and provided with one or more friction-surfaces, a longitudinally-movable sleeve 2 rotatable with a driving-shaft and having on one end a double friction-disk 4 adapted to be engaged with the friction-surfaces of the hub on the driven shaft, means for shifting said sleeve longitudinally, an outer sleeve 10 having on its periphery a plurality of bevel-pinions 12, a loose friction-disk and bevel-gear 13 intermediate said pinions and the double friction-disk and adapted to be engaged with said double friction-disk, a loose bevel-gear 14 engaged with the bevel-pinions at points opposite their engagement with the loose friction-disk and bevel-gear, and a tubular casing 15 through which said loose bevel-gear 14 is connected with the hub 8 of the driven shaft, substantially as described.

2. A reversing mechanism and coupling for shafting, comprising a longitudinally-movable sleeve rotatable with a driving-shaft and provided on one end with a double friction-disk, means for shifting said sleeve longitudinally, a hub secured to a driven shaft and having friction-surfaces to be engaged by friction-surfaces on said double friction-disk, an outer sleeve surrounding the said longitudinally-movable sleeve and provided with a plurality of bevel-pinions, a loose friction-disk intermediate said pinions and the double friction-disk and provided with bevel-teeth to engage said pinion and with a friction-surface to be engaged by a friction-surface on the double friction-disk, a bevel-gear loosely surrounding said outer sleeve and engaged with the bevel-pinions thereon, and a tubular casing through which said loose bevel-gear is connected with the hub on the driven shaft, substantially as described.

3. A reversing mechanism for shafting, comprising a longitudinally-movable inner sleeve rotatable with a driving-shaft and provided on one end with a double friction-disk, a hub secured on a driven shaft and provided with friction-surfaces to be engaged by friction-surfaces on the double friction-disk, an outer sleeve provided with a plurality of bevel-pinions, a loose friction-disk intermediate said pinions and the double friction-disk and provided on one side with bevel-teeth to engage the bevel-pinions and on the other side with a friction-surface to engage a friction-surface on the double friction-disk, a bevel-gear loose on said outer sleeve and provided with teeth to engage said bevel-pinions, a tubular casing connecting said loose bevel-gear with the hub on the driven shaft, a collar provided on one end with tongues to engage corresponding tongues on the adjacent end of said outer sleeve, an anti-friction thrust-bearing intermediate said collar and the inner longitudinally-movable sleeve, a fixed collar on said inner longitudinally-movable sleeve, and a reversing-lever for actuating said inner sleeve through the said collars thereon to reverse the rotation of the driven shaft, substantially as described.

4. In reversing mechanism for shafting, the combination with a driving-shaft and a driven shaft in line with each other, of a hub secured on the driven shaft and provided with friction-surfaces, a longitudinally-movable inner sleeve mounted on and rotatable with the driving-shaft and having on one end a double friction-disk adapted to be engaged with the friction-surfaces of said hub on the driven shaft, means for shifting said sleeve longitudinally, an outer sleeve provided with a plurality of bevel-pinions, a friction-disk and gear intermediate said pinions and said double friction-disk, a loose bevel-gear engaged with the pinions on said outer sleeve, a casing connecting said loose gear with the hub on the driven shaft, and lever mechanism for imparting longitudinal movement to said inner sleeve to cause engagement of the double friction-disk alternately with the friction-surfaces of said hub and with the friction-surfaces of the disk and gear that is engaged with said pinions, for the purpose of reversing the rotation of the driven shaft, substantially as described.

5. The combination with the driving-shaft and a driven shaft in line with each other, of a coupling and reversing mechanism comprising a tubular casing carried by the driven shaft, a bevel-gear secured in one end of said casing, a longitudinally-movable inner sleeve rotatable with the driving-shaft and carrying a double friction-disk provided with friction-surfaces adapted to be engaged with friction-surfaces in the hub end of said casing, an outer sleeve provided with a plurality of pinions engaged with said bevel-gear in one end of the casing, a loose friction-disk and bevel-gear intermediate said pinions and the double friction-disk, and lever mechanism for imparting longitudinal movement to the inner sleeve to engage its double friction-disk alternately with the friction-surfaces in the hub end of the casing and with the friction-surface of the disk and gear that is intermediate said double friction-disk and said pinions, substantially as described.

In testimony whereof I have hereunto set my hand in presence of two subscribing witnesses.

JOHN C. GEBHART.

Witnesses:
JAMES L. NORRIS,
GEO. W. REA.